(12) United States Patent
Jeong (10) Patent No.: US 6,950,470 B2
(45) Date of Patent: Sep. 27, 2005

(54) METHOD AND APPARATUS FOR OPTIMIZING OF MOTION ESTIMATION

(75) Inventor: Yeong An Jeong, Kyonggi-Do (KR)

(73) Assignee: LG Electronics Inc., Seoul (KR)

( * ) Notice: Subject to any disclaimer, the term of this patent is extended or adjusted under 35 U.S.C. 154(b) by 615 days.

(21) Appl. No.: 10/011,442

(22) Filed: Dec. 11, 2001

(65) Prior Publication Data

US 2002/0113902 A1 Aug. 22, 2002

(30) Foreign Application Priority Data

Dec. 12, 2000 (KR) .......................................... 2000-75553

(51) Int. Cl.⁷ .............................................. H04N 7/18
(52) U.S. Cl. ............................. 375/240.17; 375/240.12; 375/240.16
(58) Field of Search ..................... 375/240.12, 240.16

(56) References Cited

U.S. PATENT DOCUMENTS

| | | | | |
|---|---|---|---|---|
| 5,398,068 A | * | 3/1995 | Liu et al. ................ | 375/240.16 |
| 5,825,930 A | * | 10/1998 | Park et al. ................. | 382/236 |
| 6,130,912 A | * | 10/2000 | Chang et al. ........... | 375/240.16 |
| 6,430,317 B1 | * | 8/2002 | Krishnamurthy et al. ... | 382/236 |
| 6,473,529 B1 | * | 10/2002 | Lin ............................. | 382/236 |
| 6,765,965 B1 | * | 7/2004 | Hanami et al. ......... | 375/240.16 |

* cited by examiner

Primary Examiner—Andy Rao
(74) Attorney, Agent, or Firm—Fleshner & Kim, LLP (57) ABSTRACT

An apparatus for optimizing of motion estimation in moving picture coding comprises a macro block comparing unit for being inputted a previous video signal and a present video signal and comparing the signals as macro block unit, a pixel modularizing unit for modularizing the compared block as a plurality of pixels unit, and an SAD (Sum of the Absolute Difference) calculator for being inputted modularized plurality of pixels and calculating the most similar previous signal, and a method for optimizing of motion estimation in moving picture coding comprises a step of modularizing searching pixels included in a macro block of N×N size as a plurality of pixels unit and a step of performing the SAD calculation using the modularized searching pixels, in order to increase processing speed and minimize a lowering of picture quality by deciding a searching area as selecting some of pixel modules which include four pixels respectively using a certain rule and reducing the SAD calculation amount.

11 Claims, 7 Drawing Sheets

● SEARCHING PIXELS

○ NON-SEARCHING PIXELS
● SEARCHING PIXELS

○ NON-SEARCHING PIXELS
● SEARCHING PIXELS

METHOD AND APPARATUS FOR OPTIMIZING OF MOTION ESTIMATION

BACKGROUND OF THE INVENTION

1. Field of the Invention

The present invention relates to an image processing system, and particularly, to a method and an apparatus for optimizing of motion estimation in a coding of motion picture.

2. Description of the Background Art

Recently, interests for multimedia application services through an ultrahigh speed internet and needs for moving picture service using an ADSL (Asymmetric Digital Subscribe Line) are increased. A high speed data communication and a telephone call can be made simultaneously using a telephone line according to the ADSL. Therefore, it is essential that a video codec (coder-decoder) of high speed is installed for moving picture service using the ADSL.

Generally, there are provided or accepted MPEG (Moving Picture Experts Group)-1, MPEG-2, and MPEG-4, and H.261, H.263, and H.26L as standards for coding a video such as moving picture or a stopped picture. The international standards described above are based on motions estimating of the video, and after that, transforming a picture signal in a space or time and quantizing the picture signal in order to code residual data according to the estimation, whereby the picture signal is coded.

Figure 1:
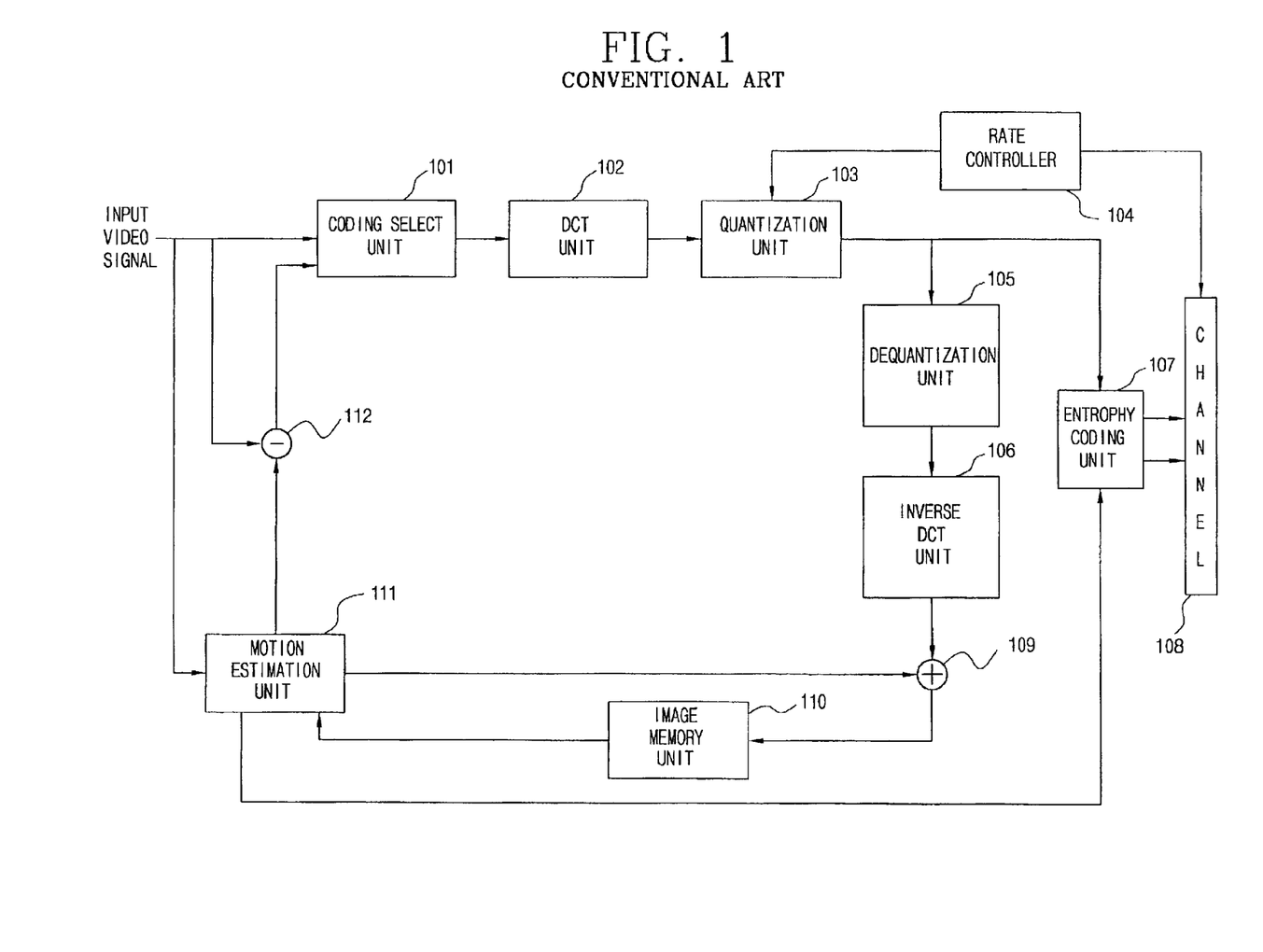
FIG. 1 a block diagram showing a structure of a moving picture coder according to the conventional art.

FIG. 1 is a block diagram showing a structure of a moving picture coder according to the conventional art. As shown therein, the moving picture coder comprises: a coding select unit 101 for selecting I-frame (a first frame and a scene change frame) and P-frame (remained frame) of an input video signal; a DCT (Discrete Cosine Transform) unit 102 for transforming the frame to a discrete cosine; a quantization unit 103 for quantizing the coefficient of the transformed DCT; an entropy coder 107 for coding the quantized signal and a motion vector using a coding method such as a variable length coding; a rate controller 104 connected to the DCT unit 102 and a channel 108 for controlling transmission rate; a dequantization unit 104 for dequantizing the quantized signal; an inverse DCT unit 106 for transforming the dequantized signal to inverse discrete cosine; an adder 109 for adding previous video signal outputted from the motion estimation unit and the inverse discrete cosine transformed signal; a picture memory unit 110 for storing the added signals; a motion estimation unit 111 for estimating the motion from the input video signal and the signal stored in the picture memory unit 110; and a subtracter 112 for subtracting the estimated picture in the motion estimation unit 111 from a picture which is inputted next.

The moving picture coder according to the conventional art which is described above will be described as follows.

A first video signal and a scene change video signal (as frame unit) among the video signal are selected as I-frame, and remained signals are selected as P-frame. Therefore, the first video signal (I-frame) is discrete cosine transformed in the DCT unit 102, the transformed signal is quantized in the quantization unit 103, and the quantized signal is coded in the entropy coding unit 107 using a method such as the VLC (Variable Length Coding), and then, the signal is transmitted to the channel 108 with the motion vector. Also, the quantized signal is transformed to the original video signal through the dequantization unit 105 and the inverse DCT unit 106, and the signal is stored in the picture memory unit 110.

Herein, the motion estimation unit 111 estimates the motion by reading the stored video signal in the picture memory unit 110 as macro block unit, after that, outputs the estimated motion vector to the entropy coding unit 107. Also, the subtracter 112 finds a difference video signal between the estimate video signal and the input video signal through the subtraction between the next input video signal and the motion vector. The coding select unit 101 selects the subtracted video signal having the difference as the P-frame, and then the video signal is coded using same method as that of the I-frame and transmitted to the channel. That is, a video signal in which the input video signal inputted after the first (that is, P-frame) and the motion vector inputted from the motion estimation unit 111 are different from each other is discrete cosine transformed in the DCT unit 102, and the transformed video signal is quantized in the quantization unit 103 and coded using VLC, and then transmitted to the channel 108. Also, the quantized video signal is restored through the dequantization unit 105 and the inverse DCT unit 106. The restored video signal and the motion vector of the motion estimation unit 111 are added in the adder 109, and after that, these are transformed into a previous video signal and stored in the video memory unit 110. In addition, the motion estimation unit 111 estimates the motion using a video signal which is inputted next and the video signal stored in the memory 110 (previous video signal).

On the other hand, the motion estimation unit 111 includes an SAD (Sum of the Absolute Difference) calculation process which estimates a similarity grade between the present video signal and the previous video signal in a set searching area (a macro block of 16×16), and the calculating is expressed as follows.

$$SAD(x, y) = \sum_{i=1, j=1}^{16,16} |\text{original} - \text{decoded\_previous}|, x, y = \pm 15$$

Herein, the SAD (x,y) designates accumulated estimate error in a searching area x,y, and a position (x,y) having the smallest SAD value is selected as a final motion vector. In addition, the SAD calculation is used in a halfpel motion estimating process, and therefore it is an important element which affects to the motion estimating process speed of the video codec (coder-decoder). Actually, a pure motion estimation, that is, SAD calculation takes 30% in the video codec (coder-decoder) in case of a CIF(common intermediate format).

Figure 2:
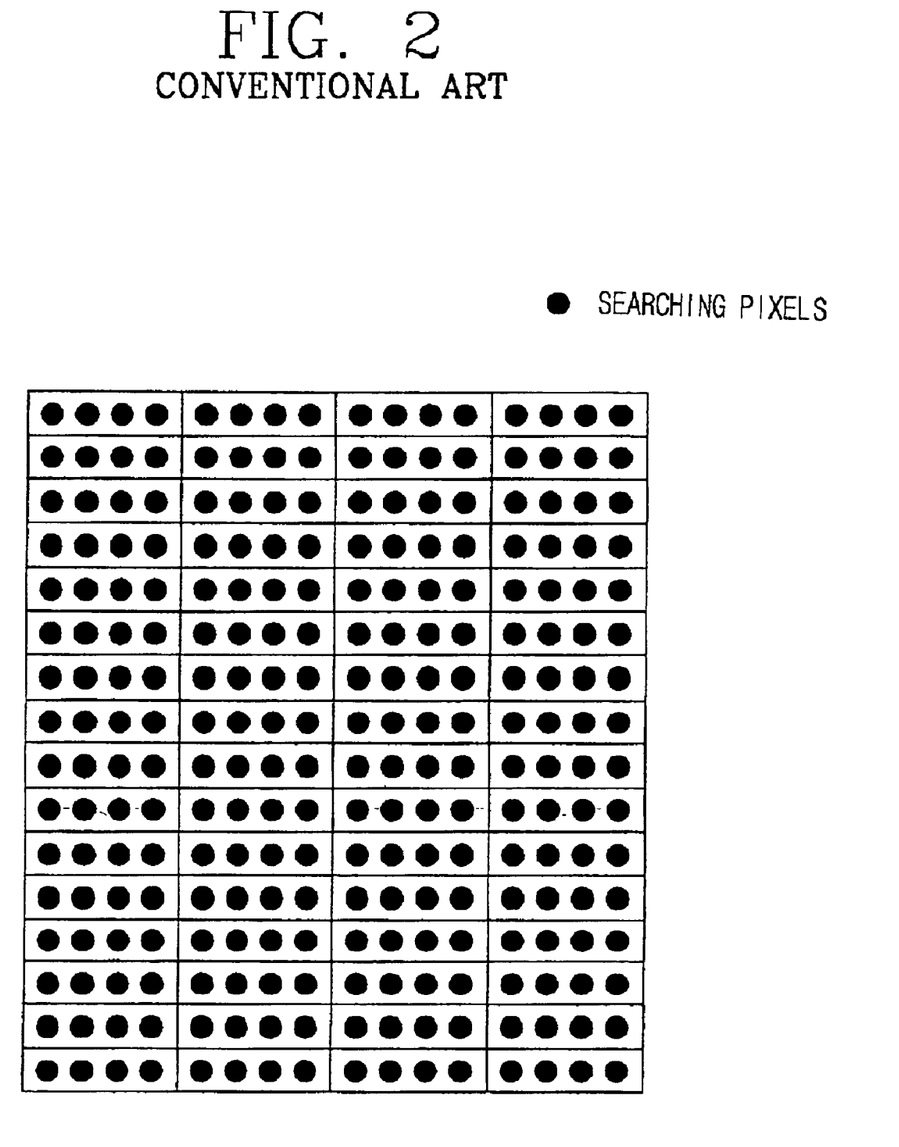
FIG. 2 is an exemplary view showing an SAD calculation method for a previous macro block and a present macro block according to the conventional art.

However, as shown in FIG. 2, according to the moving picture coder of the conventional art, a speed of motion estimation is lowered because the SAD calculation is performed for all 256 searching pixels of the macro block unit of 16×16

SUMMARY OF THE INVENTION

Therefore, an object of the present invention is to provide a method and an apparatus for optimizing of motion estimation by which the estimate process speed is increased and lowering of picture quality is minimized by deciding searching area as selecting a part of pixel module which includes four pixels by a certain rule, and therefore the SAD calculation is reduced.

Another object of the present invention is to provide a method and an apparatus for optimizing of motion estimation which can be applied to a video processing system through a PSTN (Public Switched Telephone Network) as well as through an ADSL (Asymmetric Digital Subscribe Line) by reducing the SAD calculation and optimizing a motion in motion estimation process of moving picture coding.

To achieve these and other advantages and in accordance with the purpose of the present invention, as embodied and broadly described herein, there is provided an apparatus for optimizing of motion estimation comprising: a macro block comparing unit for being inputted a previous video signal and a present video signal and comparing the two signals as macro block units respectively; a pixel modularizing unit for modularizing the compared blocks as a plurality of pixels unit; and an SAD (Sum of the Absolute Difference) calculator for being inputted the plurality of pixels which are modularized and calculating the most similar previous video signal.

Also, there is provided a method for optimizing of motion estimation comprising: a step of modularizing searching pixels which are included in a macro block of N×N size as predetermined units.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
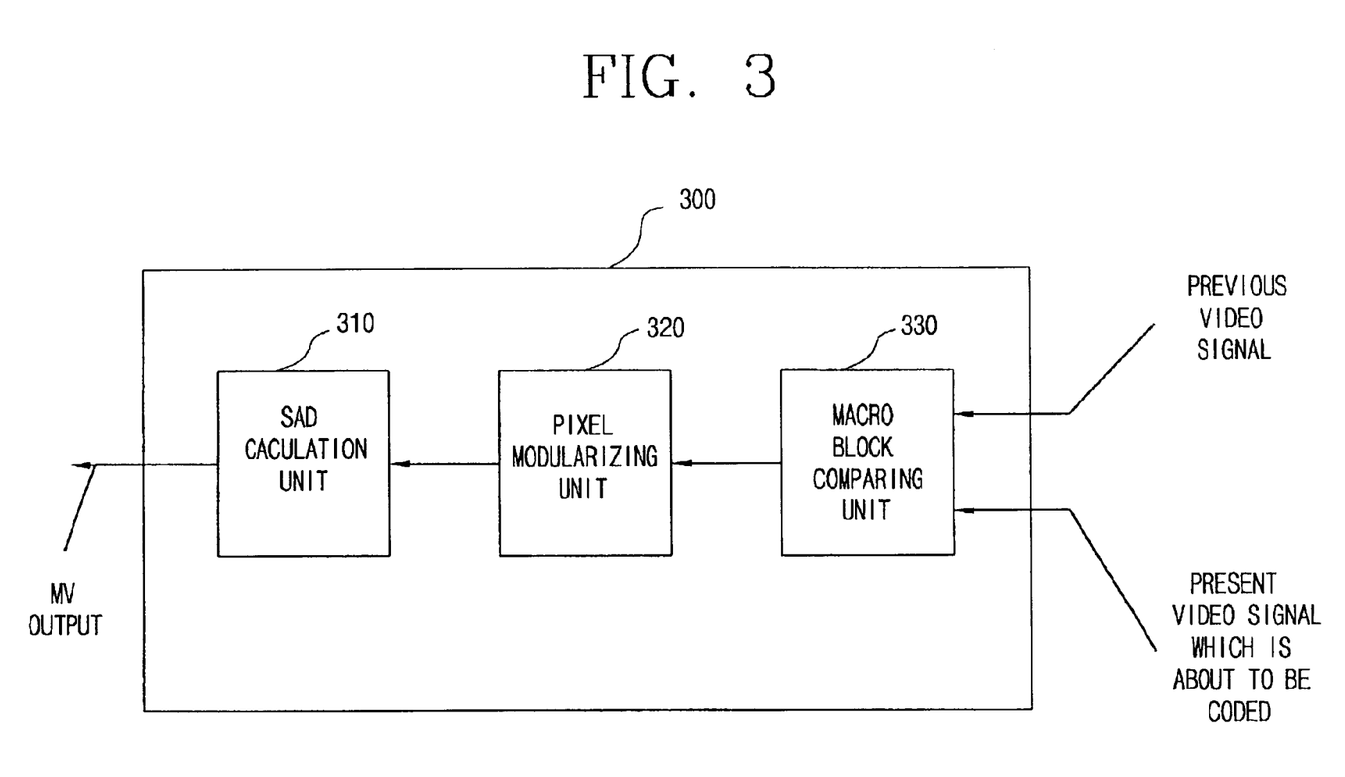
FIG. 3 is a block diagram showing a motion estimation unit according to the present invention.

FIG. 3 is a block diagram showing a motion estimation unit according to the present invention. As shown therein, the motion estimation unit 300 comprises: a macro block comparing unit 330 for comparing a previous video signal and a present video signal by macro block unit; a pixel modularizing unit 320 for modularizing the compared blocks by a plurality pixels unit; and an SAD (Sum of the Absolute Difference) calculator 310 for finding the most similar video signal with the previous video signal from the modularized plurality of pixels.

Figure 4:
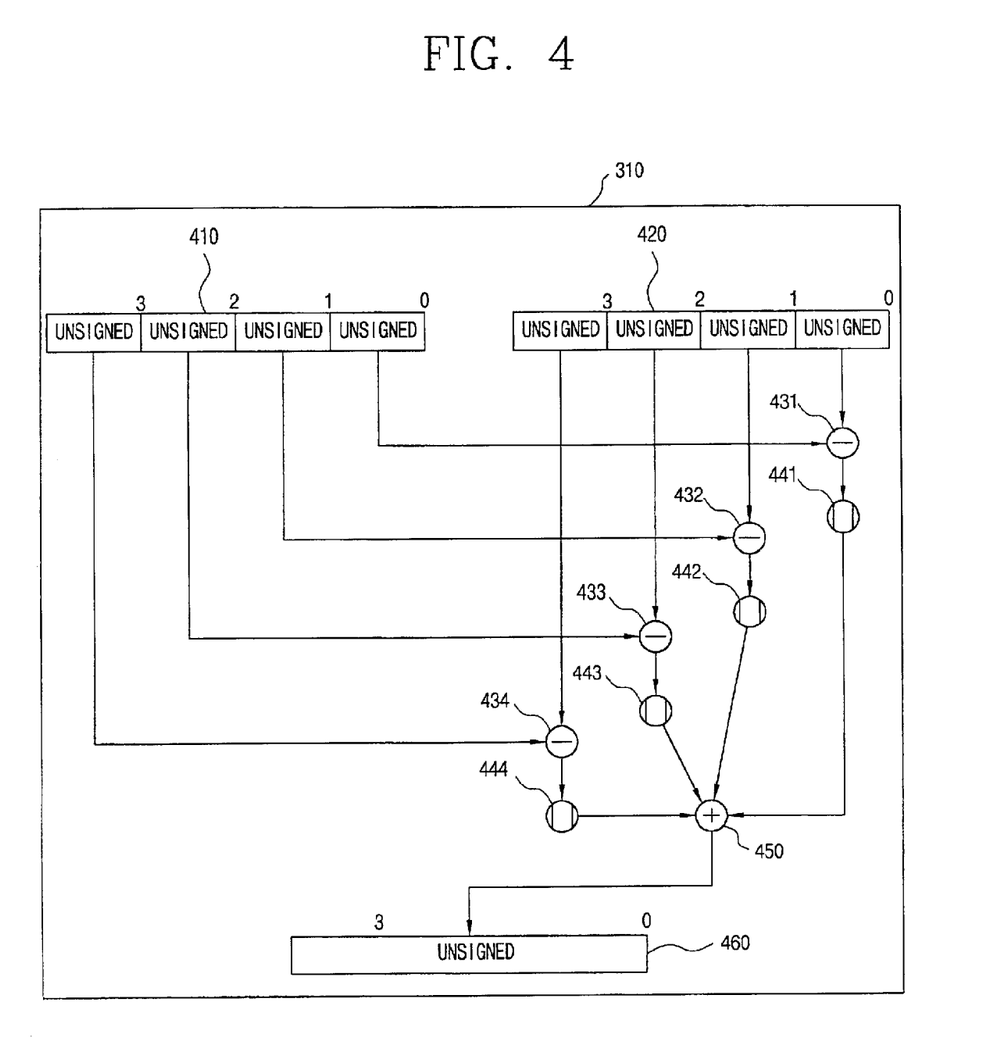
FIG. 4 is a block diagram showing an SAD calculation unit according to the present invention.

FIG. 4 is a block diagram showing the SAD calculator according to the present invention. As shown therein, the SAD calculator comprises: registers 410 and 420 for storing a pixel module including four pixels in the previous and present picture frames as a predetermined rule; four subtracters 431, 432, 433, and 434 for subtracting respective pixel modules as respective module units corresponding to the pixel modules stored in the registers 410 and 420; four absolute value calculators 441, 442, 443, and 444 for calculating absolute values of the subtracted values in the subtracters 431~434; an adder 450 for adding the absolute values of the absolute value calculators 441~444; and a register 460 for storing the added value and outputting the added value as a motion vector.

The above motion estimation unit will be described as follows with reference to Figures.

The present input video signal is discrete cosine transformed, quantized, and coded using a method such as a VLC (Variable Length Coding), at that time, the macro block comparing unit 330 is inputted the previous video signal and the present video signal and compares the previous video signal and the present video signal by macro block unit. In addition, the pixel modularizing unit 320 modularizes the respective pixels of the macro block by bundling four pixels in order to increase the SAD calculation speed, and after that outputs the modules to the SAD calculator 310. The SAD calculator 310 subtracts four pixel modules of the previous macro block from the corresponding pixel modules of the present macro block, and then calculates absolute values for the subtracted values. After that, the motion vector is made by adding the respective absolute values. That is, four pixel modules of the macro blocks of 16×16 size are selected by a certain rule and stored in the registers 410 and 420. The pixel modules which are stored in the registers 410 and 420 are selected by a certain rule shown in FIGS. 5A, 5B, 6A and 6B.

Figure 5A:
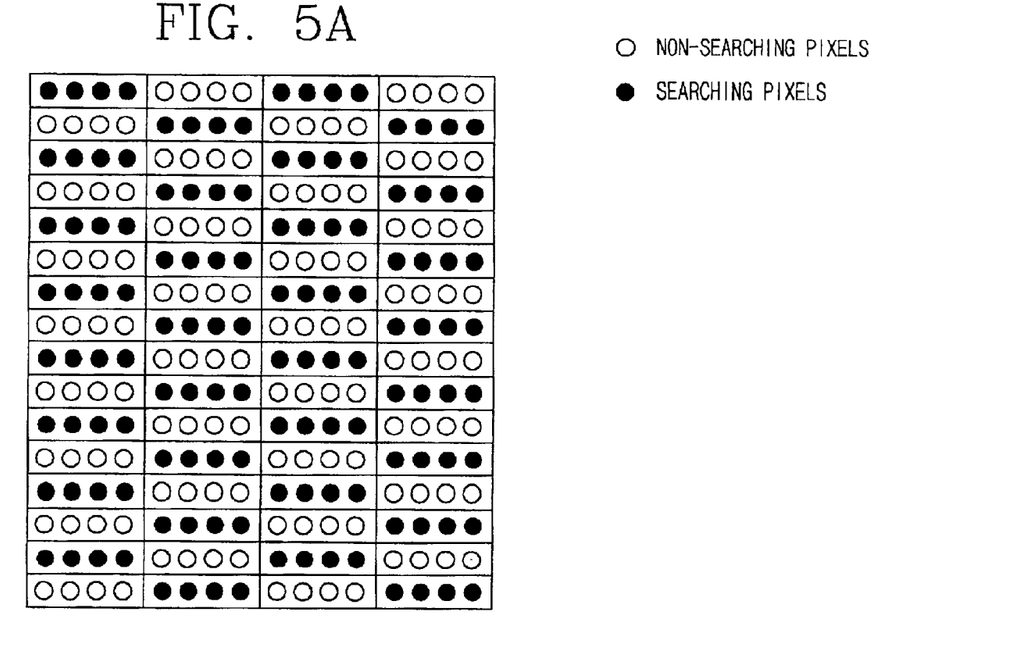
FIGS. 5A and 5B are first exemplary views showing SAD calculating for a previous macro block and a present macro block according to the present invention.
Figure 5B:
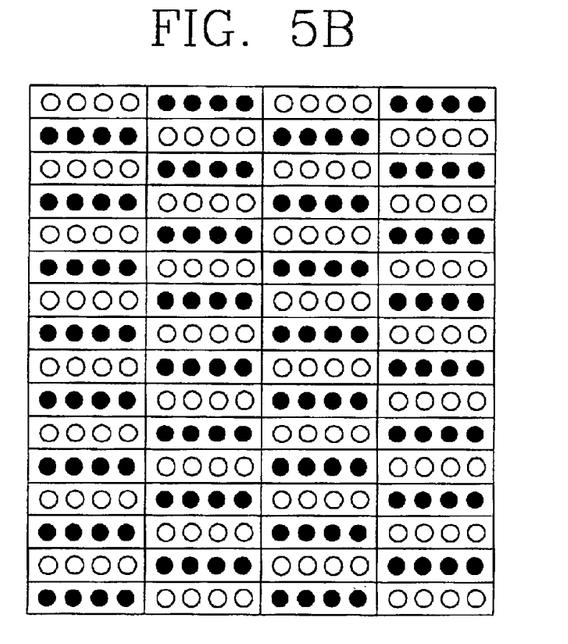

Herein, FIGS. 5A and 5B are showing a case that a pixel modules on an odd number or an even number in a line, and orders of the pixel modules selected from the odd line and even line are opposite with each other. FIG. 5A is an exemplary view showing a case that a pixel module on odd number is selected from an odd line, and a pixel module on even number is selected from an even line, and FIG. 5B is an exemplary view showing a case that a pixel module on even number is selected from an odd line, and a pixel module on odd number is selected from an even line.

When the pixel modules are selected as described above, the subtracters 431~434 subtract four pixel modules which are stored in the registers 410 and 420 as corresponding module units, and the absolute value calculator 441~444 calculate the absolute values for the subtracted values. Then, the adder 450 adds the four absolute values and stores the added value in the register 460.

For example, if '0x05050505' is stored in the register 410 and '0x01010101' is stored in the register 420, the above values are calculated through the subtracters 431~434, the absolute value calculators 441~444, and the adder 450, and '16' is stored in the register 460. In addition, a vector according to the stored value in the register 460 is outputted as the motion vector, and therefore a position vector corresponding to the smallest SAD calculation value is selected as the motion vector after calculations for all the pixel modules are completed. In that case, the calculating amount is reduced as half as that of the conventional art, and the calculation speed is increased twice as that of the conventional art.

Actually, a codec (coder-decoder) applied by the present invention can achieve speed improvement about 7% comparing to the conventional art in consideration of 30% rated took by the pure motion estimation, that is, the SAD calculation in the video codec (coder-decoder) in case of the CIF(common intermediate format).

Also, as a second embodiment of the present invention, the pixel modularizing unit 320 selects pixel modules (four modules) on odd or even number of respective lines by skipping one line, and the SAD calculation is performed by designating the selected pixel modules as searching area.

Figure 6A:
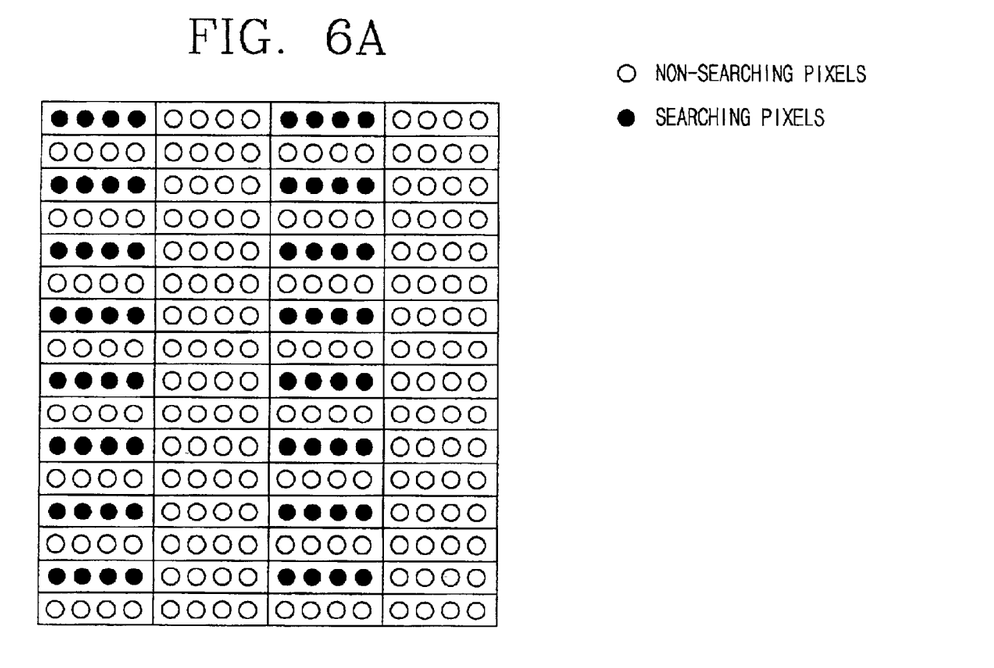
FIGS. 6A and 6B are second exemplary views showing SAD calculating for a previous macro block and a present macro block according to the present invention.
Figure 6B:
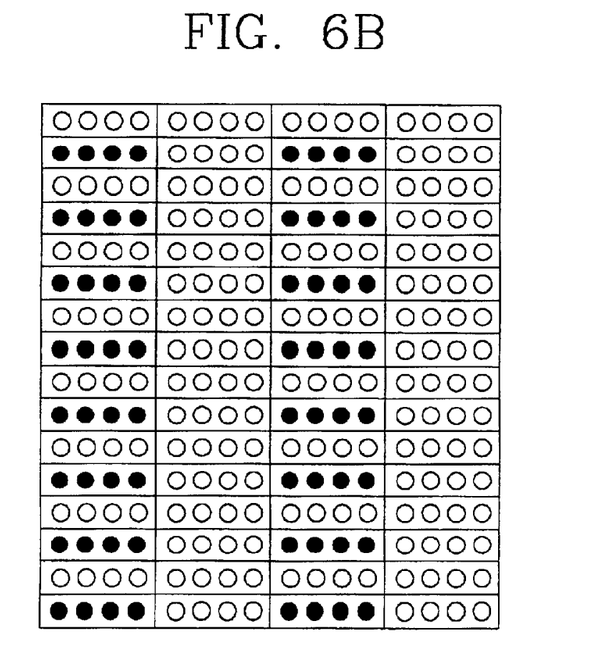

For example, FIG. 6A and 6B are showing a case that pixel modules on odd numbers from odd line or even line only, FIG. 6A is showing a case that pixel modules on odd numbers are selected from odd lines, and FIG. 6B is showing a case that pixel modules on even numbers are selected from only even lines.

The calculation amount is reduced by ⅛ of the conventional art in the above embodiment, and the speed is increased 8 times as that of the conventional art.

Figure 7:
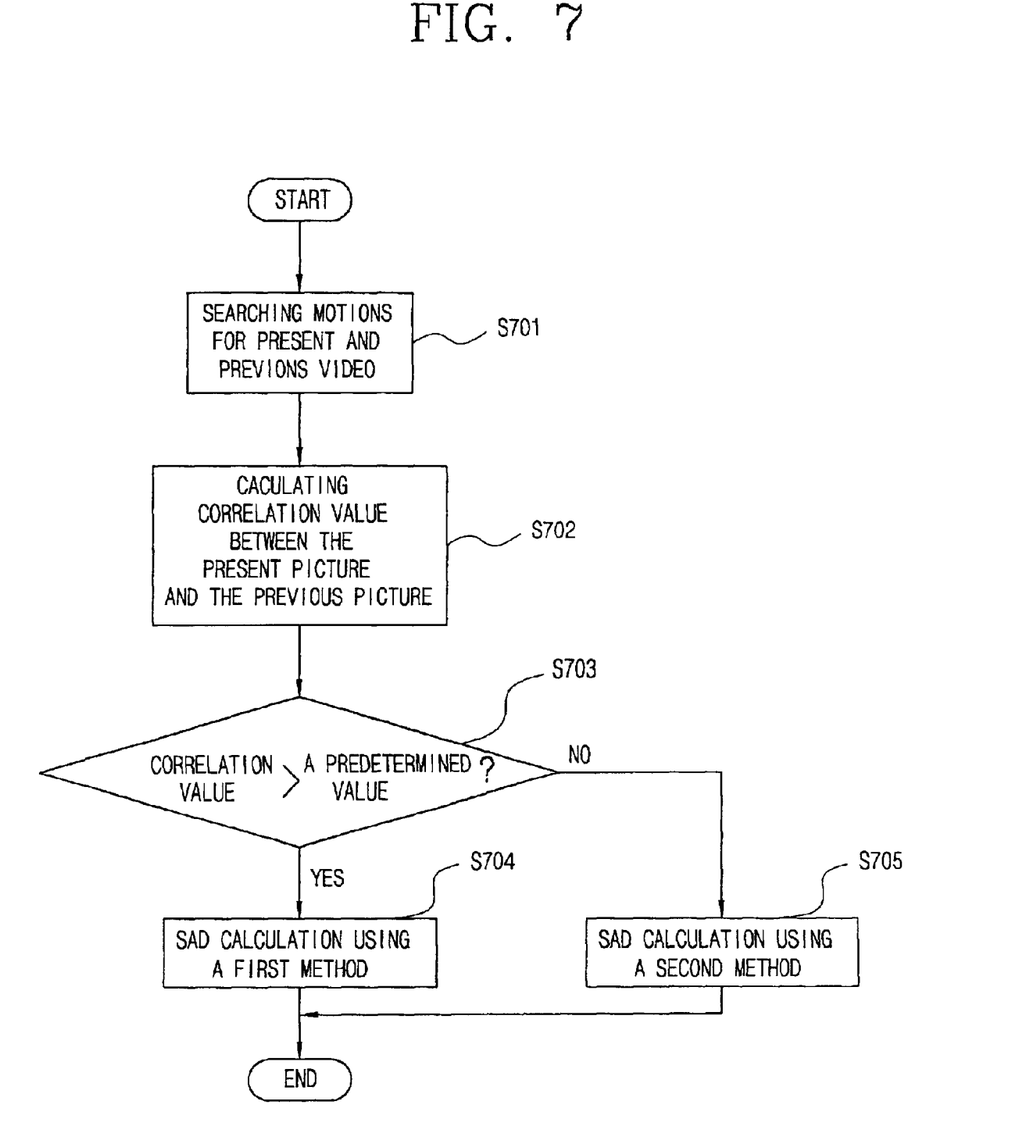
FIG. 7 is a flow chart showing an adaptive SAD calculation method for macro block according to the present invention.

Also, as shown in FIG. 7, the motion estimation unit 300 may perform adaptive SAD calculation through a correlation between the compared macro blocks for selecting automatically a plurality of pixel modules during the SAD calculation as a third embodiment of the present invention.

FIG. 7 is a flow chart showing the adaptive SAD calculation method of the macro block according to the present invention, as shown therein, motion searching for the previous and present pictures is performed, after that, correlation values of the present and the previous pictures are calculated and the SAD calculation is performed according to the correlation values.

That is, the motion estimating for the present and the previous pictures is completes (S701), after that, correlation values between the respective macro blocks are calculated for the SAD calculation (S702). And then, the SAD calculation method is selected according to the calculated correlation values, and the motion vector is coded according to the SAD calculation result and transmitted to the channel. Herein, if the correlation value between the previous picture and the present picture is larger than a predetermined value, an error of the motion vector is not large even if the SAD calculation of the first method such that the pixel modules on odd numbers are selected from only odd lines or even lines of is the macro block, and therefore the SAD calculation is performed using the first method (S703, and S704). If the correlation value is smaller than the predetermined value, the SAD calculation is performed using the second method such that the pixel modules on odd numbers or on even numbers from the respective lines of the macro block, and the orders of the pixel modules selected from the odd lines and from the even lines are to be opposite with each other, and therefore the error which may be generated can be reduced (S703, and S705). The predetermined value may be set between 0.7~0.9.

As described above, in the motion estimation during the moving picture coding, parts of the pixel modules including four pixels respectively are selected by a certain rule and the searching area is decided to be the above pixel modules, and therefore the SAD calculation amount can be reduced, whereby the motion estimation performing speed can be increased and lowering of picture quality can be minimized.

Also, according to the present invention, the SAD calculation is reduced so that the motion can be minimized, and therefore the present invention can be applied to the video processing system using the PSTN (Public Switched Telephone Network) as well as the ADSL (Asymmetric Digital Subscribe Line).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for performing motion estimation comprising:
   a macro block comparing unit for comparing a previous video signal and a present picture signal as macro block unit;
   a pixel modularizing unit for modularizing pixels of the compared macro blocks by bundling four pixels in order to increase SAD (Sum of the Absolute Difference) calculation speed; and
   an SAD calculator for calculating a motion vector by being inputted the modularized plurality of pixels;
   wherein the pixel modularizing unit selects pixel modules on an odd or even number of respective lines by skipping one line of the macro block and the orders of the pixel modules selected from the odd lines and from the even lines are made to be opposite with each other, or wherein the pixel modularizing unit selects pixel modules on odd numbers from the odd lines or from the even lines of the macro block.

2. The apparatus of claim 1, wherein the SAD calculator compares the modules of each macro block and calculates absolute values of the compared modules.

3. The apparatus of claim 1, wherein the SAD calculator comprises:
   a first register and a second register for storing the plurality of pixel modules respectively;
   a plurality of subtracters for subtracting the pixel modules stored in the first and second registers;
   a plurality of absolute value calculator for calculating absolute values;
   an adder for adding the absolute values outputted from the plurality of absolute value calculator; and
   a third register for storing the added values.

4. A method for motion estimation comprising:
   a step of modularizing a plurality of searching pixels in a macro block of N×N size into a plurality of units; and
   a step of performing SAD calculation using the modularized searching pixels;
   wherein the modularizing step selects pixel modules on an odd or even number of respective lines by skipping one line of the macro block and the orders of the pixel modules selected from the odd lines and from the even lines are made to be opposite with each other, or the modularizing step selects pixel modules on odd number from odd or even lines of the macro block; and
   wherein the pixel modularizing unit modularizes the respective pixels of the macro block by four pixels.

5. The method of claim 4, wherein the size of the macro block is 16×16.

6. A method for performing motion estimation comprising:
   a step of finding correlation between respective macro blocks after searching operations for a present picture and for a previous picture are completed;

a step of modularizing searching pixels of the macro block as four-pixel modules in order to increase SAD (Sum of Absolute Difference) calculation speed according to results of the correlation:

a step of selecting some of the modularized searching pixels; and a step of performing SAD calculation according to results of the correlation.

7. The method of claim 6, wherein when the result of the correlation is larger than a certain value the step of selecting some of the modularized searching pixels selects pixel modules on odd numbers from odd or even lines of the macro block.

8. The method of claim 6, wherein when the result of the correlation is smaller than a certain value, the step of selecting some of the modularized searching pixels selects pixel modules on odd numbers or on even numbers from the respective lines by skipping one line of the macro block, and the orders of the pixel modules selected from the odd lines and of the pixel modules selected from the even lines are made to be opposite with each other.

9. The method of claim 7, wherein when the result of the correlation is smaller than the certain value, the step of selecting some of the modularized searching pixels selects pixel modules on odd numbers or on even numbers from the respective lines by skipping one line of the macro block, and the orders of the pixel modules selected from the odd lines and of the pixel modules selected from the even lines are made to be opposite with each other.

10. The apparatus of claim 1, wherein the SAD calculator consists of:

a first register and a second register for storing the plurality of pixel modules respectively;

a plurality of subtracters for subtracting the pixel modules stored in the first and second registers;

a plurality of absolute value calculator for calculating absolute values;

an adder for adding the absolute values outputted from the plurality of absolute value calculator; and a third register for storing the added values.

11. An apparatus for performing motion estimation, comprising:

a macro block comparing unit configured to compare a previous video signal and a present picture signal as macro block unit;

a pixel modularizing unit configured to modularize pixels of the compared macro blocks by bundling four pixels in order to increase SAD (Sum of the Absolute Difference) calculation speed; and an SAD calculator configured to calculate a motion vector by being inputted the modularized bundled four pixels;

wherein the pixel modularizing unit is configured to select pixel modules on an odd or even number of respective lines by skipping one line of the macro block and the orders of the pixel modules selected from the odd lines and from the even lines are made to be opposite with each other.

* * * * *